(No Model.)
J. SOLTER.
AUTOMATIC STEAM REGULATOR.
No. 505,179. Patented Sept. 19, 1893.
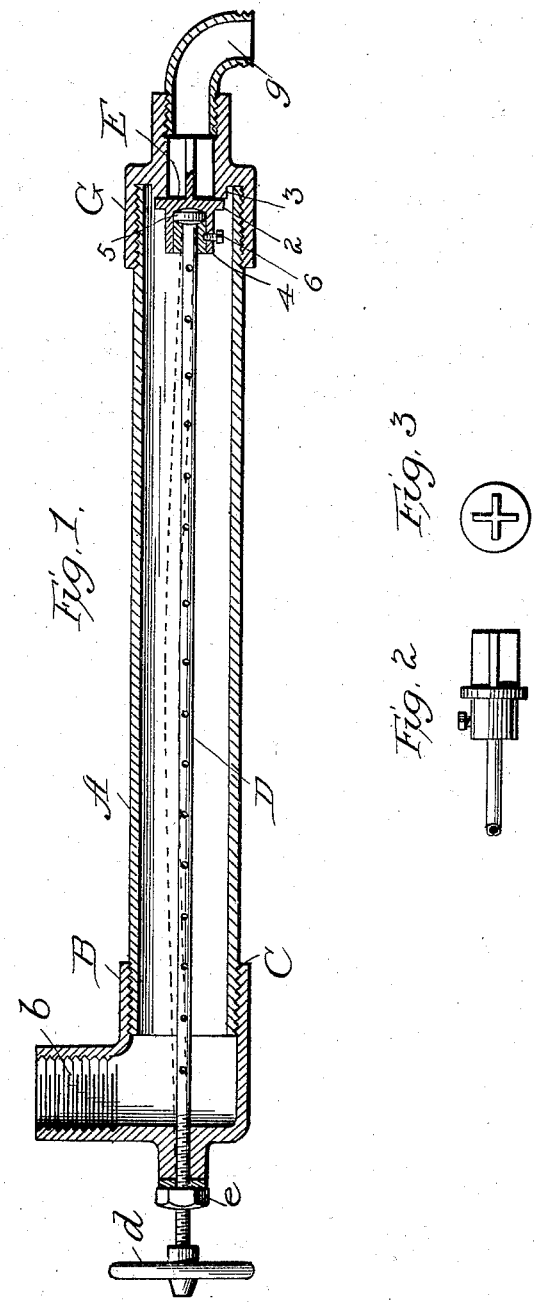

UNITED STATES PATENT OFFICE.

JOHN SOLTER, OF BALTIMORE, MARYLAND.

AUTOMATIC STEAM-REGULATOR.

SPECIFICATION forming part of Letters Patent No. 505,179, dated September 19, 1893.

Application filed May 3, 1893. Serial No. 472,902. (No model.)

*To all whom it may concern:*

Be it known that I, JOHN SOLTER, a citizen of the United States of America, residing at Baltimore, in the State of Maryland, have invented certain new and useful Improvements in Automatic Steam-Regulators, of which the following is a specification.

My invention is an improved automatic steam regulator. It is designed for steam radiators, but is not necessarily limited in its use to such radiators.

The object of my invention is to provide a regulator which is sensitive to changes of temperature and acts promptly under slight changes, and further to provide a regulator which will adjust itself to extreme changes without derangement to the parts, and will act with equal accuracy, both at the higher or lower degrees of heat to which it may be subjected.

My said invention is illustrated in the accompanying drawings, in which—

Figure 1, represents my improved regulator in longitudinal section. Fig. 2, is a side elevation of the valve, and Fig. 3, an end view of the same, Figs. 2 and 3 representing the parts detached.

In the drawings, A, represents the outer shell or case of the regulator. It is preferably made of iron pipe. At one end it is connected to a casting B, which has an inlet opening b threaded for connection with the radiator. Centrally arranged on the casting is a boss C, with a hole threaded and in line with the axis of the pipe A. Within the pipe A is a brass tube D, which forms the stem of the valve E. This pipe is formed with holes cut through its walls at preferably regular intervals. The left hand end is threaded externally and passes through the boss and is provided with a hand wheel d, by means of which it may be turned to set it and the valve in proper position. Upon the threaded end of the pipe is a jam nut e, with a lead washer interposed between it and the end of the boss. The other end of the pipe is connected to the valve E. This valve is formed with wings, as shown in Fig. 3 which fit into a seat in the cap G, screwed upon the end of the case A. The bearing face of the valve is upon the flange 2, and it bears upon the annular flange 3, upon the inner face of the cap or casting G. The wings of the valve in the tubular part serve to guide it and to maintain it in proper position. The valve is provided with a socket 4, to receive the head 5 of the rod D, said head bearing on the bottom of the socket and being held by a washer inserted in the open end of the socket, said washer being held by screw 6. By this construction expansion or contraction of the valve D will operate the valve to and from its seat.

The outlet passage from the case is shown at g, this being threaded for any suitable connections.

It will be understood that the regulator is placed in a suitable position, so as to receive the water of condensation from the radiator as well as to receive the steam.

I have described the stem D, as being made of a pipe perforated at regular intervals throughout its length. The object of the perforations is two-fold, first to allow the steam or water of condensation to enter the pipe and more readily and uniformly heat it. The perforations also diminish the stiffness of the pipe and allow it when under compression to spring laterally or buckle and thus yield when by reason of high heat, it is subjected to longitudinal compression after the valve is brought to its seat. It will be understood that this regulator acts after the fashion of others of its class, the greater expansion and contraction of the brass under the influence of the varying temperature serving to operate the valve. If the valve be set for a comparatively low temperature, that for example resulting from twenty pounds pressure, a much higher degree of heat causes a continued expansion of the stem after the valve is seated. This with the rigid spindles heretofore used compresses the parts and disarranges the proportions, so that when the temperature is reduced the valve is not closed. But with the spindle constructed to spring laterally, the excessive pressure is taken up by the lateral elastic movement and when the excessive pressure is removed the stem returns to its normal position and acts to close the valve under the lower temperature with the same accuracy.

I have described the stem as being made with a perforated tube, but it will be apparent that a flat bar may be used or other form of cross section, with approximately the same effect in respect to the lateral spring. It is essential to this part of my invention that the stem should be elastic and capable of yielding laterally under the pressure.

I do not limit myself as to the material of the case and stem, but it will be understood that in regulators of this class materials of different expansion are used.

The valve is set for action by means of the handle $d$, and the jam nut $e$ and thereafter works automatically under the varying temperatures of the steam and water of condensation.

I claim—

1. In combination with the casing A, the cap G having a valve seat, a valve, a valve stem within the casing and adjustably connected at its outer end said valve stem being composed of a perforated expansible tube adapted to spring laterally, substantially as described.

2. In combination, the casing A, the casting B, having an inlet and threaded boss, the cap G, having a valve seat and outlet, the valve the tubular stem having holes and adapted to spring laterally and means for adjusting said spindle, substantially as described.

3. In combination with the case having a valve seat and tubular outlet an expansible stem within the less expansible case carrying a valve fitting said seat and having wings extending within said tubular outlet and bearing against the wall thereof and a wheel and jam nut for setting said valve, substantially as described.

In testimony whereof I affix my signature in presence of two witnesses.

JOHN SOLTER.

Witnesses:
THOMAS H. GARDNER,
F. C. BOESCH.